United States Patent
Nakayama et al.

(10) Patent No.: US 11,613,820 B2
(45) Date of Patent: Mar. 28, 2023

(54) DIAPHRAGM FOR ALKALINE WATER ELECTROLYSIS, METHOD FOR PRODUCING SAME, AND METHOD FOR PRODUCING INORGANIC-ORGANIC COMPOSITE MEMBRANE

(71) Applicant: NIPPON SHOKUBAI CO., LTD., Osaka (JP)

(72) Inventors: Shinya Nakayama, Osaka (JP); Kazuki Furusho, Osaka (JP)

(73) Assignee: Nippon Shokubai Co., Ltd., Osaka (JP)

(*) Notice: Subject to any disclaimer, the term of this patent is extended or adjusted under 35 U.S.C. 154(b) by 562 days.

(21) Appl. No.: 16/633,512

(22) PCT Filed: Jul. 4, 2018

(86) PCT No.: PCT/JP2018/025398
§ 371 (c)(1),
(2) Date: Jan. 23, 2020

(87) PCT Pub. No.: WO2019/021774
PCT Pub. Date: Jan. 31, 2019

(65) Prior Publication Data
US 2021/0130967 A1    May 6, 2021

(30) Foreign Application Priority Data

Jul. 26, 2017  (JP) .............. JP2017-144676
Jan. 16, 2018  (JP) .............. JP2018-005048

(51) Int. Cl.
| | | |
|---|---|---|
| C25B 13/08 | (2006.01) | |
| C08J 3/205 | (2006.01) | |
| C08J 9/00 | (2006.01) | |
| C08J 9/28 | (2006.01) | |
| C08K 3/22 | (2006.01) | |
| C25B 1/04 | (2021.01) | |

(52) U.S. Cl.
CPC ............ C25B 13/08 (2013.01); C08J 3/2053 (2013.01); C08J 9/008 (2013.01); C08J 9/28 (2013.01); C08K 3/22 (2013.01); C08J 2201/0544 (2013.01); C08J 2381/06 (2013.01); C08K 2003/222 (2013.01); C08K 2201/005 (2013.01); C08K 2201/011 (2013.01); C08K 2201/016 (2013.01); C25B 1/04 (2013.01)

(58) Field of Classification Search
None
See application file for complete search history.

(56) References Cited

U.S. PATENT DOCUMENTS

| | | |
|---|---|---|
| 4,699,857 A | 10/1987 | Giovannoni et al. |
| 6,447,943 B1 | 9/2002 | Peled et al. |
| 6,492,047 B1 | 12/2002 | Peled et al. |
| 2003/0091883 A1 | 5/2003 | Peled et al. |
| 2005/0186461 A1 | 8/2005 | Hommura et al. |
| 2008/0241629 A1 | 10/2008 | Peled et al. |
| 2008/0257722 A1 | 10/2008 | Tomba et al. |
| 2010/0173187 A1* | 7/2010 | Nishikawa .......... H01M 50/431 429/129 |
| 2011/0171514 A1 | 7/2011 | Nishikawa et al. |
| 2011/0278177 A1 | 11/2011 | Schussler et al. |
| 2012/0321929 A1 | 12/2012 | Nishikawa et al. |
| 2015/0364790 A1 | 12/2015 | Yonehara et al. |
| 2018/0073155 A1 | 3/2018 | Suzuki et al. |
| 2018/0171494 A1* | 6/2018 | Ito ........................... C25B 1/04 |

FOREIGN PATENT DOCUMENTS

| | | |
|---|---|---|
| CN | 1411618 | 4/2003 |
| CN | 1685548 | 10/2005 |
| CN | 101689624 | 3/2010 |
| CN | 101656306 | 7/2012 |
| EP | 0 265 136 | 4/1988 |
| FR | 2 209 608 | 7/1974 |
| JP | 57-16186 | 1/1982 |
| JP | 2013-204146 | 10/2013 |
| JP | 2013-220608 | 10/2013 |
| JP | 2013-249510 | 12/2013 |
| JP | 2015-170441 | * 9/2015 |
| JP | 2017-002389 | 1/2017 |
| JP | 2017-066184 | 4/2017 |
| WO | 2016/148302 | 9/2016 |
| WO | 2016/203701 | 12/2016 |

OTHER PUBLICATIONS

Machine translation of Takaoka et al. JP 2015-170441 (Year: 2015).*

* cited by examiner

*Primary Examiner* — Robert T Butcher
(74) *Attorney, Agent, or Firm* — Hamre, Schumann, Mueller & Larson, P.C.

(57) ABSTRACT

The invention provides a diaphragm for alkaline water electrolysis with reduced dissolution of an inorganic component in an alkali solution at low cost. The present invention relates to a diaphragm for alkaline water electrolysis, including magnesium hydroxide and an organic polymer resin.

18 Claims, 1 Drawing Sheet

DIAPHRAGM FOR ALKALINE WATER ELECTROLYSIS, METHOD FOR PRODUCING SAME, AND METHOD FOR PRODUCING INORGANIC-ORGANIC COMPOSITE MEMBRANE

TECHNICAL FIELD

The present invention relates to diaphragms for alkaline water electrolysis and methods for producing the same. The present invention specifically relates to a low cost diaphragm for alkaline water electrolysis with reduced dissolution of an inorganic component and a method for producing the same. The present invention also relates to a method for producing an inorganic-organic composite membrane.

BACKGROUND ART

For realization of a low-carbon society, renewable energies using natural energy such as solar light, wind power, and geothermal heat have been conventionally introduced. However, the energy production from power generation systems using renewable energy, such as a wind-power generation system and a solar power generation system, is variable depending on weather conditions, leading to imbalance of demand and supply of electricity and generation of surplus power. In order to store and use such surplus power in the form of energy, "power-to-gas" technology is attracting an interest in recent years. This technology is specifically to convert surplus power into a gas fuel such as hydrogen or methane using electrolysis of water and to store and use the gas fuel.

Water electrolysis is known as an industrial method for producing hydrogen. It is usually performed by applying a direct current to water containing an electrolyte such as sodium hydroxide or potassium hydroxide that is introduced to increase the conductivity. Water electrolysis uses an electrolytic cell including an anode compartment and a cathode compartment separated by a diaphragm.

Water electrolysis occurs by electron (or ion) transfer. For efficient electrolysis, a diaphragm needs to have high ion permeability. The diaphragm also needs to have gas barrier properties so that it can separate oxygen generated in an anode compartment and hydrogen generated in a cathode compartment from each other. Water electrolysis uses a high concentration alkaline aqueous solution of about 30% and is performed at about 80° C. to about 90° C. Thus, the diaphragm also needs to have high-temperature resistance and alkali resistance.

A variety of diaphragms for alkaline water electrolysis to be used for water electrolysis have been proposed so far. For example, Patent Literature 1 proposes a diaphragm for alkaline water electrolysis including an ion-permeable membrane and a porous reinforcement on one or both of the sides of the ion-permeable membrane, wherein the ion-permeable membrane is composed of a polymer containing an ion exchange group, and the porous reinforcement includes a metal oxide. Also for example, Patent Literature 2 proposes a diaphragm for alkaline water electrolysis including a sheet-like porous support and a microporous membrane containing an organic polymer resin, the microporous membrane being stacked on one or both of the sides of the porous support. Also for example, Patent Literature 3 proposes a diaphragm for alkaline water electrolysis including a polyphenylene copolymer-containing microporous membrane having an average pore diameter and porosity in specific ranges and a support substrate. Such a diaphragm is highly resistant to hydrolysis at high temperatures and in a highly acidic or highly alkaline environment and has both high gas barrier properties and ion permeability at the same time.

Such conventional diaphragms for alkaline water electrolysis are subjected to hydrophilization in order to enhance the ion permeability and prevent attachment of generated gas to the diaphragm. Specifically, a metal oxide such as zirconium oxide or titanium oxide or a metal hydroxide is introduced into the surface of the diaphragm.

CITATION LIST

Patent Literature

Patent Literature 1: JP 2013-249510 A
Patent Literature 2: JP 2013-204146 A
Patent Literature 3: JP 2017-66184 A

SUMMARY OF INVENTION

Technical Problem

Unfortunately, zirconium oxide and titanium oxide used in a conventional diaphragm for alkaline water electrolysis are very expensive, and use thereof increases production cost for the diaphragm. Further, zirconium oxide or titanium oxide has a high specific gravity. Thus, in the case of a large diaphragm for alkaline water electrolysis containing such an oxide fit to a large electrolysis apparatus, it is heavy and is difficult to handle during production or use of the membrane. Also, since water electrolysis uses a high concentration alkali solution of about 30%, it is required that a diaphragm for alkaline water electrolysis does not cause dissolution of an inorganic component from in an alkali solution as much as possible.

The invention has been made in view of the state of the art and aims to provide a diaphragm for alkaline water electrolysis with reduced dissolution of an inorganic component in an alkali solution at low cost. The present invention also aims to provide a method for producing a diaphragm for alkaline water electrolysis with reduced dissolution of an inorganic component at low cost.

Solution to Problem

The present inventors have conducted various studies on materials of a diaphragm for alkaline water electrolysis and found that use of magnesium hydroxide and an organic polymer resin can lead to a diaphragm for alkaline water electrolysis which is excellent in ion permeability and dense to achieve high gas barrier properties, and is one with reduced dissolution of an inorganic component even when the diaphragm is in contact with an alkali solution at low cost. In conventional production of a diaphragm for alkaline water electrolysis, it is believed that use of magnesium hydroxide causes dissolution of an inorganic component (magnesium) from the diaphragm during water electrolysis (also referred to as "electrolysis"), the inorganic component reacts with carbonate ions dissolved in water to produce water-insoluble magnesium carbonate, and the magnesium carbonate deposits on an electrode or the diaphragm to inhibit transfer of electrons or ions, leading to a significant reduction in the electrolysis efficiency. Therefore, magnesium hydroxide has not been used as a material of a diaphragm for alkaline water electrolysis so far. The present inventors found that a diaphragm containing magnesium hydroxide and an organic polymer resin is one with reduced dissolution of an inorganic component (magnesium) even when it is used in an alkali solution and can be used as a diaphragm for alkaline water electrolysis. The present inventors also found that since magnesium hydroxide is less expensive and has a lower specific gravity than conventionally used zirconium oxide and titanium oxide, use of magnesium hydroxide leads to a lighter-weight diaphragm for alkaline water electrolysis at lower cost.

That is, one aspect of the present invention relates to a diaphragm for alkaline water electrolysis, including:

magnesium hydroxide; and an organic polymer resin.

The organic polymer resin is preferably at least one selected from the group consisting of polysulfone, polyethersulfone, and polyphenylsulfone.

The magnesium hydroxide preferably has an average particle size of 0.05 to 2.0 μm.

The diaphragm for alkaline water electrolysis preferably has a porosity of 20 to 80 vol %.

The diaphragm for alkaline water electrolysis preferably contains 20 to 40 parts by mass of the organic polymer resin relative to 100 parts by mass of the magnesium hydroxide.

The diaphragm for alkaline water electrolysis preferably further includes a porous support.

The porous support preferably contains at least one resin selected from the group consisting of polypropylene, polyethylene, and polyphenylene sulfide.

The porous support is preferably a non-woven fabric, a woven fabric, or a mesh.

Another aspect of the present invention also relates to a method for producing a diaphragm for alkaline water electrolysis containing magnesium hydroxide and an organic polymer resin, the method including the steps of:

preparing a dispersion containing magnesium hydroxide and a solvent;

mixing the dispersion and an organic polymer resin to prepare a resin mixture; and forming a membrane using the resin mixture.

The step of forming a membrane preferably includes the steps of:

forming a coating of the resin mixture;

bringing the coating into contact with a non-solvent to coagulate the coating; and drying the coagulated coating to give a porous membrane.

Yet another aspect of the present invention also relates to a method of using a membrane containing magnesium hydroxide and an organic polymer resin as a diaphragm for an alkaline water electrolysis apparatus.

Still another aspect of the present invention also relates to use of a membrane containing magnesium hydroxide and an organic polymer resin as a diaphragm for an alkaline water electrolysis apparatus.

Still yet another aspect of the present invention also relates to a method for producing an inorganic-organic composite membrane containing a particulate metal hydroxide and a hydrophobic resin, the method including the steps of:

forming a coating of a resin composition containing a particulate metal hydroxide, a hydrophobic resin, and a solvent; and bringing the coating into contact with water to coagulate the coating, the solvent being at least one selected from the group consisting of N-methyl-2-pyrrolidone, N,N-dimethylacetamide, N,N-dimethylformamide, and dimethyl sulfoxide.

The resin composition is preferably prepared by mixing and dispersing a particulate metal hydroxide, a hydrophobic resin, and a solvent.

The hydrophobic resin is preferably at least one selected from the group consisting of polysulfone, polyethersulfone, and polyphenylsulfone.

The particulate metal hydroxide is preferably at least one selected from the group consisting of particulates of magnesium hydroxide, zirconium hydroxide, and titanium hydroxide.

The resin composition in an amount of 100 mass % preferably contains 15 to 50 mass % of the particulate metal hydroxide, 3 to 22 mass % of the hydrophobic resin, and 45 to 75 mass % of the solvent.

The magnesium hydroxide preferably has an average particle size of 0.1 to 1.5 μm.

The magnesium hydroxide is preferably tabular.

The magnesium hydroxide preferably has an aspect ratio of 2.0 to 8.0.

The magnesium hydroxide preferably has a crystallite size in the direction perpendicular to the (110) plane determined by X-ray diffraction of 35 nm or greater.

The magnesium hydroxide preferably has a crystallite size in the direction perpendicular to the (001) plane determined by X-ray diffraction of 15 nm or greater.

Advantageous Effects of Invention

The diaphragm for alkaline water electrolysis of the present invention is of low cost, while it is excellent in ion permeability, is dense to achieve high gas barrier properties, and is one with extremely highly reduced dissolution of an inorganic component in an alkali solution. Thus, it can be suitably used for alkaline water electrolysis. The method for producing a diaphragm for alkaline water electrolysis of the present invention is a production method suitable for production of such a diaphragm for alkaline water electrolysis.

DESCRIPTION OF EMBODIMENTS

Figure 1:
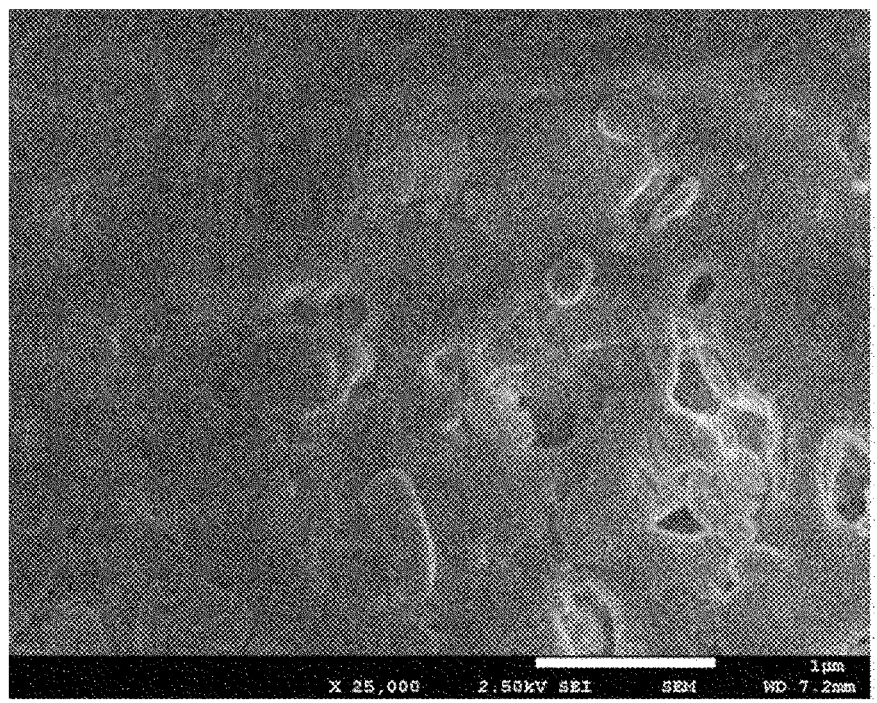
FIG. 1 is a photograph of a field emission scanning electron microscope (FE-SEM) image (magnification: 25000×) of a surface of a diaphragm for alkaline water electrolysis obtained in Example 1 before an alkali resistance test.

The present invention is specifically described below.

Any combination of two or more of the following preferred embodiments of the present invention is also a preferred embodiment of the present invention.

1. Diaphragm for Alkaline Water Electrolysis

The diaphragm for alkaline water electrolysis of the present invention contains magnesium hydroxide and an organic polymer resin and is thus one with reduced dissolution of an inorganic component in an alkali solution. The diaphragm containing magnesium hydroxide has enhanced alkali resistance. Further, owing to the inexpensiveness of magnesium hydroxide, the diaphragm for alkaline water electrolysis can be produced at low cost.

The reason why the diaphragm for alkaline water electrolysis containing magnesium hydroxide and an organic polymer resin is thus one with reduced dissolution of an inorganic component is presumably that magnesium hydroxide is slightly soluble in an alkali solution, and in addition, magnesium hydroxide is coated with the organic polymer resin and is thus extremely highly less likely to be in contact with an alkali solution. Thereby, dissolution of magnesium hydroxide is reduced.

The following describes the constitutional components of the diaphragm for alkaline water electrolysis.

(Magnesium Hydroxide)

The diaphragm for alkaline water electrolysis of the present invention contains magnesium hydroxide. The diaphragm for alkaline water electrolysis of the present invention can exhibit ion permeability when voids between magnesium hydroxide and the organic polymer resin are filled with an electrolyte solution. The diaphragm for alkaline water electrolysis containing magnesium hydroxide is hydrophilic and prevents oxygen gas and hydrogen gas generated in water electrolysis from adhering to the diaphragm. Thereby, electrolysis is not interrupted.

The magnesium hydroxide used in the present invention may be, but is not limited to, a natural substance or a synthetic substance. The magnesium hydroxide may be one not surface treated or may be one surface treated with a silane coupling agent, stearic acid, oleic acid, or a phosphoric acid ester.

The magnesium hydroxide may have any shape and may be amorphous, particulate, granular, tabular such as flaky or hexagonal tabular, or fibrous. The magnesium hydroxide is preferably particulate, tabular, or fibrous because it is easily dispersed in a solution and a coating liquid is easily prepared. It is more preferably particulate or tabular, still more preferably tabular, particularly preferably flaky in terms of adhesion to the resin and ion permeability.

The magnesium hydroxide preferably has an aspect ratio of 2.0 to 8.0. The magnesium hydroxide having an aspect ratio within the range can lead to a diaphragm having much better ion permeability and excellent uniformity. The aspect ratio is more preferably 2.5 to 7.0, still more preferably 3.0 to 6.0.

The aspect ratio herein means the ratio of the largest diameter <a> to the smallest diameter <b> (<a>/<b>). The aspect ratio can be determined as follows: particulate magnesium hydroxide is observed with a SEM, any 10 particles in the resulting image are analyzed using analysis software to determine the ratios of the largest diameter <a> to the smallest diameter <b> (<a>/<b>) of the particles, and the ratios are averaged to obtain a simple average as the aspect ratio of the particles.

Usually, the smallest diameter <b> is preferably the smallest diameter of the diameters each passing through the midpoint of the largest diameter <a> and perpendicular to the largest diameter.

For example, in the case of a tabular particle such as a flaky or hexagonal particle, the largest diameter <a> indicates the major axis of a tabular face of the particle, and in the case of a fibrous particle, the largest diameter <a> indicates the length of the fiber.

For example, in the case of a tabular particle such as a flaky or hexagonal particle, the smallest diameter <b> indicates the thickness of the particle, and in the case of a fibrous particle, the smallest diameter <b> indicates the diameter of the fiber. Preferably, the thickness of a particle and the diameter of a fiber are respectively the thickness and the diameter each passing through the midpoint of the largest diameter <a>.

The aspect ratio can be specifically determined by the method described in EXAMPLES below.

The magnesium hydroxide preferably has an average particle size of 0.05 to 2.0 µm. The magnesium hydroxide having an average particle size within the range can lead to a diaphragm having much better ion permeability and gas barrier properties. The average particle size of the magnesium hydroxide is more preferably 0.1 µm or greater, still more preferably 0.2 µm or greater. It is more preferably 1.5 µm or smaller, still more preferably 1.0 µm or smaller, particularly preferably 0.5 µm or smaller.

The average particle size of the magnesium hydroxide is more preferably 0.1 to 1.5 µm, still more preferably 0.2 to 1.0 µm, particularly preferably 0.2 to 0.5 µm.

The average particle size is a volume average particle size (D50) determined by particle size distribution measurement based on laser diffraction. Specifically, the average particle size is determined as follows: the particle size distribution is determined with a laser diffraction/scattering particle size distribution analyzer (Model: "LA-920" available from Horiba, Ltd.), and the median size (D50) in the particle size distribution by volume is determined as the average particle size. The measurement sample is a mixture of ethanol and particles dispersed therein by ultrasonic irradiation. More specifically, the average particle size can be determined by the method described in EXAMPLES below.

The magnesium hydroxide preferably has a crystallite size in the direction perpendicular to the (110) plane determined by X-ray diffraction of 35 nm or greater. The magnesium hydroxide having a crystallite size in the direction perpendicular to the (110) plane within the above range can lead to a diaphragm having much better ion permeability and uniformity.

The crystallite size in the direction perpendicular to the (110) plane is preferably 40 nm or greater, more preferably 50 nm or greater, still more preferably 60 nm or greater, particularly preferably 65 nm or greater.

The upper limit of the crystallite size in the direction perpendicular to the (110) plane is usually, but not limited to, for example, 400 nm or less, preferably 350 nm or less, still more preferably 300 nm or less.

The magnesium hydroxide preferably has a crystallite size in the direction perpendicular to the (001) plane determined by X-ray diffraction of 15 nm or greater.

The crystallite size in the direction perpendicular to the (001) plane is more preferably 18 nm or greater, still more preferably 21 nm or greater, particularly preferably 24 nm or greater.

The upper limit of the crystallite size in the direction perpendicular to the (001) plane is usually, but not limited to, for example, 300 nm or less, preferably 250 nm or less, still more preferably 200 nm or less.

The crystallite size can be determined as follows: the X-ray diffraction pattern of particulate magnesium hydroxide is measured by powder X-ray diffraction, and the crystallite size (crystallite size in the direction perpendicular to the lattice plane) is calculated from the breadth (half-band width) of the diffraction peak attributed to the corresponding lattice plane using the Scherrer equation. The crystallite size can be specifically determined according to the method described in EXAMPLES below.

Magnesium hydroxide having the crystallite sizes within the above specified ranges can be obtained as follows, for example.

An aqueous solution of a magnesium salt (e.g., magnesium chloride, magnesium nitrate) or an aqueous dispersion of magnesium oxide obtained by a conventionally known method is prepared as a starting material, and an alkaline substance (e.g., lithium hydroxide, sodium hydroxide, calcium hydroxide, ammonia water) is added thereto to cause a hydration reaction. Thereby, magnesium hydroxide is prepared. In this case, addition of an organic acid such as formic acid, acetic acid, or propionic acid; nitric acid; a polybasic acid such as sulfuric acid; or a mixture thereof allows control of the solubility of the resulting magnesium hydroxide, or appropriate control of the temperature (e.g., 150° C. to 270° C.) and the duration (e.g., 30 minutes to 10 hours) of the hydrothermal reaction. Thereby, particles of different crystallite sizes can be prepared. Addition of a greater amount of such an acid can lead to faster crystal growth and greater crystallite size. A higher temperature of the hydrothermal reaction or a longer reaction time leads to faster crystal growth and greater crystallite size.

The magnesium hydroxide in the present invention may be a common commercial product. Examples of commercial magnesium hydroxide which may be used in the present invention include 200-06H available from Kyowa Chemical Industry Co., Ltd., UP650-1 available from Ube Material Industries, Ltd., MAGSTAR #20 available from Tateho Chemical Industries Co., Ltd., and #200 available from Konoshima Chemical Co., Ltd.

The magnesium hydroxide is preferably present in an amount of 30 to 90 mass % in 100 mass % of the diaphragm for alkaline water electrolysis. The presence of the magnesium hydroxide in an amount within the above range can lead to a diaphragm with further reduced dissolution of an inorganic component in an alkali solution, having excellent ion permeability, gas barrier properties, heat resistance, and alkali resistance. The magnesium hydroxide is more preferably present in an amount of 32 to 85 mass %, still more preferably 35 to 80 mass % in 100 mass % of the diaphragm for alkaline water electrolysis. When the diaphragm for alkaline water electrolysis of the present invention does not include the below-described porous support, the magnesium hydroxide is preferably present in an amount of 60 to 90 mass %, more preferably 65 to 85 mass %, still more preferably 70 to 80 mass % in 100 mass % of the diaphragm for alkaline water electrolysis.

When the diaphragm for alkaline water electrolysis of the present invention includes the below-described porous support, the magnesium hydroxide is preferably present in an amount of 30 to 45 mass %, more preferably 32 to 43 mass %, still more preferably 35 to 40 mass % in 100 mass % of the diaphragm for alkaline water electrolysis.

(Organic Polymer Resin)

The diaphragm for alkaline water electrolysis of the present invention further contains an organic polymer resin. The organic polymer resin holds the particulate magnesium hydroxide. Even though, the magnesium hydroxide itself is highly stable in an alkali solution, and, in the presence of the organic polymer resin, the surface of the particulate magnesium hydroxide is coated with the organic polymer resin and is thus considerably less likely to be in contact with an alkali solution, whereby dissolution of an inorganic component from the diaphragm in an alkali solution can be further reduced.

The organic polymer resin may be any resin that can hold the surface of the particulate magnesium hydroxide, preferably that can sufficiently cover the surface of the particulate magnesium hydroxide to achieve the effects of the present invention. Examples thereof include fluorine resin such as polyvinylidene fluoride and polytetrafluoroethylene, olefin resin such as polypropylene, and aromatic hydrocarbon resin such as polyethylene terephthalate and polystyrene. Each of these may be used alone, or two or more of these may be used in combination. Preferred is aromatic hydrocarbon resin because it can lead to a diaphragm for alkaline water electrolysis having excellent heat resistance and alkali resistance.

Specific examples of the aromatic hydrocarbon resin include polyethylene terephthalate, polybutylene terephthalate, polybutylene naphthalate, polystyrene, polysulfone, polyethersulfone, polyphenylene sulfide, polyphenylsulfone, polyarylate, polyetherimide, polyimide, and polyamide-imide. Preferred among these is at least one selected from the group consisting of polysulfone, polyethersulfone, and polyphenylsulfone in order to achieve much better alkali resistance, and more preferred is polysulfone in terms of production.

Use of at least one selected from the group consisting of polysulfone, polyethersulfone, and polyphenylsulfone can lead to a diaphragm for alkaline water electrolysis having a lower membrane resistance and higher alkali resistance. Thus, the diaphragm can have much better stabilities of size, mass, and membrane resistance and can have a much better effect of suppressing generation of voids when it is used in an alkali solution for a long time.

The organic polymer resin is preferably present in an amount of 5 to 40 mass % in 100 mass % of the diaphragm for alkaline water electrolysis. The presence of the organic polymer resin in an amount within the above range can further reduce dissolution of an inorganic component from the diaphragm for alkaline water electrolysis in an alkali solution. In addition, the diaphragm for alkaline water electrolysis obtained may have excellent ion permeability, gas barrier properties, heat resistance, and alkali resistance. The organic polymer resin is more preferably present in an amount of 7 to 35 mass %, still more preferably 10 to 30 mass % in 100 mass % of the diaphragm for alkaline water electrolysis.

When the diaphragm for alkaline water electrolysis of the present invention does not include the below-described porous support, the organic polymer resin is preferably present in an amount of 10 to 40 mass %, more preferably 15 to 35 mass %, still more preferably 20 to 30 mass % in 100 mass % of the diaphragm for alkaline water electrolysis.

When the diaphragm for alkaline water electrolysis of the present invention includes the below-described porous support, the organic polymer resin is preferably present in an amount of 5 to 20 mass %, more preferably 7 to 18 mass %, still more preferably 10 to 15 mass % in 100 mass % of the diaphragm for alkaline water electrolysis.

The diaphragm for alkaline water electrolysis of the present invention preferably contains the organic polymer resin in an amount of 20 to 40 parts by mass, more preferably 22 to 38 parts by mass, still more preferably 25 to 35 parts by mass relative to 100 parts by mass of the magnesium hydroxide. The presence of the magnesium hydroxide and the organic polymer resin in the above ratio can further reduce dissolution of an inorganic component from the diaphragm for alkaline water electrolysis in an alkali solution. In addition, the diaphragm for alkaline water electrolysis obtained may have excellent ion permeability, gas barrier properties, heat resistance, and alkali resistance.

(Porous Support)

The diaphragm for alkaline water electrolysis of the present invention includes a membrane containing the magnesium hydroxide and the organic polymer resin, and may further optionally include a porous support in addition to the membrane. The porous support is porous and has ion permeability and is a member usable as a support of the diaphragm for alkaline water electrolysis. The porous support is preferably a sheet-like member.

The porous support may be formed from a material such as polyethylene, polypropylene, polysulfone, polyethersulfone, polyphenylsulfone, polyphenylene sulfide, polyketone, polyimide, polyetherimide, or resin such as fluorine resin. Each of these may be used alone, or two or more of these may be used in combination. In order to achieve excellent heat resistance and alkali resistance, the porous support preferably contains at least one resin selected from the group consisting of polypropylene, polyethylene, and polyphenylene sulfide, more preferably contains at least one selected from the group consisting of polypropylene and polyphenylene sulfide.

The porous support may be in the form of, for example, a non-woven fabric, a woven fabric, a mesh, a porous membrane, or a fabric mixture of a non-woven fabric and a woven fabric. It is preferably a non-woven fabric, a woven fabric, or a mesh, more preferably a non-woven fabric or a mesh, still more preferably a non-woven fabric.

The porous support used in the present invention is preferably a non-woven fabric, woven fabric, or mesh containing at least one resin selected from the group consisting of polypropylene, polyethylene, and polyphenylene sulfide.

The porous support is preferably a non-woven fabric or mesh containing polyphenylene sulfide.

In the case of a sheet-like porous support, the porous support may have any thickness as long as the diaphragm for alkaline water electrolysis of the present invention achieves the effects of the present invention.

For example, the thickness is preferably 30 to 300 µm, more preferably 50 to 250 µm, still more preferably 100 to 200 µm.

In the diaphragm for alkaline water electrolysis of the present invention, the membrane containing the magnesium hydroxide and the organic polymer resin may be formed on one or both of the surfaces of the porous support. Alternatively, the diaphragm for alkaline water electrolysis of the present invention may be a composite in which the porous support and the membrane containing the magnesium hydroxide and the organic polymer resin are integrated with each other. The diaphragm for alkaline water electrolysis in the form of a composite with the porous support can have higher strength and toughness than the membrane alone.

The diaphragm for alkaline water electrolysis of the present invention preferably has a porosity of 20 to 80 vol %, more preferably 25 to 75 vol %, still more preferably 30 to 70 vol %. The diaphragm having a porosity within the above ranges can have excellent ion permeability and excellent gas barrier properties because the pores of the diaphragm are continuously filled with an electrolyte solution.

The porosity can be determined as follows: the diaphragm for alkaline water electrolysis is immersed in an electrolyte solution overnight, and the mass of the diaphragm is measured before and after absorbing the electrolyte solution. The porosity can be specifically determined using the following equation.

Porosity (vol %)=(Mass of diaphragm after immersion−Mass of diaphragm before immersion)/ Density of electrolyte solution/Volume of diaphragm×100

Each pore of the diaphragm for alkaline water electrolysis of the present invention preferably has a size of 0.01 to 1 µm, more preferably 0.05 to 0.9 µm, still more preferably 0.1 to 0.8 µm. Pore having a size within the above ranges can lead to much better ion permeability.

The pore size can be determined from a surface observation image (magnification: 25000×) of the diaphragm for alkaline water electrolysis based on FE-SEM measurement. Specifically, any 10 voids in a FE-SEM image of the diaphragm for alkaline water electrolysis are analyzed using analysis software (Image-Pro Premier available from NIPPON ROPER K.K.) to determine the diameters of the voids, each passing through the center of gravity of the corresponding void. The diameters are averaged to determine the pore size.

The diaphragm for alkaline water electrolysis of the present invention preferably has a percentage of change in pore size before and after the alkali resistance test of 50% or less, more preferably 30% or less.

The percentage of change in pore size can be determined using the following equation.

Percentage of change in pore size (%)={[(Pore size after alkali resistance test)−(Pore size before alkali resistance test)]/(Pore size before alkali resistance test)}×100

The pore size before the alkali resistance test refers to the pore size of the diaphragm for alkaline water electrolysis immersed in a 30% aqueous solution of potassium hydroxide at 90° C. for 20 hours and taken out therefrom. The pore size after the alkali resistance test refers to the pore size of the diaphragm further immersed in a 30% aqueous solution of potassium hydroxide at 90° C. for one week and taken out therefrom.

The pore size can be determined by the above method.

The pore size and the percentage of change in pore size of the diaphragm for alkaline water electrolysis can be more specifically determined by the methods described in EXAMPLES.

The diaphragm for alkaline water electrolysis of the present invention may have any thickness, which may be appropriately selected to fit the size of equipment to be used or in terms of handleability, for example. In terms of the gas barrier properties, the ion permeability, or the strength of the diaphragm, the thickness is preferably 50 to 1000 µm, more preferably 100 to 500 µm, still more preferably 200 to 400 µm.

The diaphragm for alkaline water electrolysis of the present invention including the porous support preferably has a thickness of 50 to 1000 µm, more preferably 100 to 500 µm, still more preferably 200 to 400 µm.

The amount of magnesium dissolved from the diaphragm for alkaline water electrolysis of the present invention is preferably 0.5 ppm or less, more preferably 0.3 ppm or less, still more preferably 0.2 ppm or less. The amount of magnesium dissolved is a value calculated as follows: the diaphragm for alkaline water electrolysis is immersed in a 30% aqueous solution A of potassium hydroxide at 90° C. for 20 hours and is taken out therefrom and then immersed in a 30% aqueous solution B of potassium hydroxide at 90° C. for one week and taken out therefrom. The difference between the amount A1 of magnesium in the aqueous solution A of potassium hydroxide after 20-hour immersion and the amount B1 of magnesium in the aqueous solution B of potassium hydroxide after one-week immersion (B1−A1) is calculated. The amounts of magnesium in the aqueous solutions A and B of potassium hydroxide can be determined with an inductively coupled plasma mass spectrometer.

The amount of magnesium dissolved can be more specifically determined by the method described in EXAMPLES.

2. Method for Producing Diaphragm for Alkaline Water Electrolysis

The method for producing a diaphragm for alkaline water electrolysis of the present invention is described.

The diaphragm for alkaline water electrolysis of the present invention may be produced by any method and may be produced by a known method. In order to efficiently produce a diaphragm for alkaline water electrolysis with reduced dissolution of an inorganic component in an alkali solution, having excellent ion permeability and gas barrier properties, non-solvent-induced phase separation is preferred.

Specifically, the method for producing the diaphragm for alkaline water electrolysis of the present invention preferably includes the following steps (1) to (3):

(1) a step of preparing a dispersion containing magnesium hydroxide and a solvent, (2) a step of mixing the dispersion and an organic polymer resin to prepare a resin mixture, and (3) a step of forming a membrane using the resin mixture.

In an aspect of the present invention, the method for producing a diaphragm for alkaline water electrolysis, that is, the method for producing a diaphragm for alkaline water electrolysis containing magnesium hydroxide and an organic polymer resin includes the steps of preparing a dispersion containing magnesium hydroxide and a solvent, mixing the dispersion and an organic polymer resin to prepare a resin mixture, and forming a membrane using the resin mixture.

The following described these steps.

(1) Step of Preparing Dispersion Containing Magnesium Hydroxide and Solvent

In the production method of the present invention, magnesium hydroxide may be mixed with an organic polymer resin as follows: solid magnesium hydroxide may be mixed as it is or a dispersion (slurry) of solid magnesium hydroxide in a solvent may be mixed. Preferably, a dispersion (slurry) of solid magnesium hydroxide in a solvent is prepared before. In the mixture of the dispersion (slurry) of magnesium hydroxide and the organic polymer resin, the magnesium hydroxide and the organic polymer resin are more homogeneously mixed with each other. This allows sufficient coating of the magnesium hydroxide with the organic polymer resin, leading to a diaphragm for alkaline water electrolysis sufficiently with reduced dissolution of an inorganic component.

Any solvent may be used to disperse the magnesium hydroxide as long as it can dissolve the organic polymer resin to be mixed later, and examples thereof include N-methyl-2-pyrrolidone, N,N-dimethylacetamide, N,N-dimethylformamide, and dimethyl sulfoxide. Each of these solvents may be used alone or a mixture of two or more of these may be used. In order to achieve good dispersibility of the magnesium hydroxide, N-methyl-2-pyrrolidone is particularly preferred.

The dispersion preferably contains the magnesium hydroxide in an amount of 20 to 70 mass %, more preferably 30 to 60 mass %, still more preferably 40 to 50 mass %.

The magnesium hydroxide may be dispersed in a solvent by any method, and may be dispersed using a mixer, a ball mill, a jet mill, a disperser, a sand mill, a roll mill, a pot mill, a paint shaker, or other known mixing and dispersing means.

(2) Step of Mixing Dispersion and Organic Polymer Resin to Prepare Resin Mixture The organic polymer resin may be mixed with the dispersion prepared in the step (1) by any method that can sufficiently mix the dispersion and the organic polymer resin. The organic polymer resin may be directly mixed with the dispersion; or a resin solution prepared in advance in which the organic polymer resin is dissolved in a solvent may be mixed with the dispersion. In order to more homogeneously disperse and mix the magnesium hydroxide and the organic polymer resin, the resin solution prepared in advance is preferably mixed with the dispersion.

Any solvent may be used to prepare the resin solution as long as it can dissolve the organic polymer resin, and examples thereof include N-methyl-2-pyrrolidone, N,N-dimethylacetamide, N,N-dimethylformamide, and dimethyl sulfoxide. In order to more homogeneously disperse and mix the magnesium hydroxide and the organic polymer resin, the solvent is preferably the same as the above solvent used to prepare the dispersion.

The resin solution preferably contains the organic polymer resin in an amount of 10 to 50 mass %, more preferably 15 to 40 mass %, still more preferably 20 to 30 mass %.

The mixing may be performed by the mixing and dispersing means as described in the step (1).

The dispersion and the organic polymer resin are mixed in such a ratio that the amount of the organic polymer resin is preferably 20 to 40 parts by mass, more preferably 22 to 38 parts by mass, still more preferably 25 to 35 parts by mass relative to 100 parts by mass of the magnesium hydroxide.

When the magnesium hydroxide dispersion and the organic polymer resin solution are mixed, the sum of the amount of the solvent in the magnesium hydroxide dispersion and the amount of the solvent in the organic polymer resin solution is preferably 45 to 75 mass %, more preferably 50 to 70 mass %, still more preferably 55 to 65 mass % based on 100 mass % of the total mass of the magnesium hydroxide dispersion and the organic polymer resin solution. Use of the solvents in such proportions is preferred to lead to a diaphragm for alkaline water electrolysis having a porosity within a preferred range.

(3) Step of Forming Membrane Using Resin Mixture

A membrane is formed using the resin mixture obtained in the step (2).

For easy production of a diaphragm for alkaline water electrolysis with further reduced dissolution of an inorganic component in an alkali solution, the membrane is preferably formed by the method including the following steps (3-a) to (3-c):

(3-a) a step of forming a coating of the resin mixture, (3-b) a step of bringing the coating into contact with a non-solvent to coagulate the coating, and (3-c) a step of drying the coagulated coating to give a porous membrane.

In a preferred embodiment of the method for producing a diaphragm for alkaline water electrolysis of the present invention, the step (3) of forming a membrane includes forming a coating of the resin mixture, bringing the coating into contact with a non-solvent to coagulate the coating, and drying the coagulated coating to give a porous membrane.

(3-a) Step of Forming Coating of Resin Mixture

The coating may be formed from the resin mixture by, for example, a method of applying the resin mixture prepared as described above to a substrate or a method of immersing a substrate in the resin mixture to obtain a resin mixture-impregnated substrate. For simple formation of the coating, the resin mixture is preferably applied to a substrate.

The resin mixture may be applied to a substrate by any method, and may be applied using die coating, spin coating, gravure coating, curtain coating, a spray, an applicator, a coater, or other known application means.

The substrate may be any one on which a coating can be formed by application of the resin mixture, and examples thereof include a film or sheet formed from polytetraethylene terephthalate, polyethylene naphthalate, polypropylene, polyethylene, polyvinyl chloride, polyvinyl acetal, polymethyl methacrylate, or polycarbonate and a glass sheet. For reduction in raw material cost, polytetraethylene terephthalate is preferred.

In the production of the diaphragm for alkaline water electrolysis including a porous support, the substrate may be any of the above porous supports.

In the production of the diaphragm for alkaline water electrolysis in the form of a composite in which the porous support and the membrane containing the magnesium hydroxide and the organic polymer resin are integrated with each other, the resin mixture may be applied to the substrate, and the porous support may be placed on the applied liquid to impregnate the porous support with the applied liquid.

Any amount of the resin mixture may be applied. The amount may be appropriately set so that the diaphragm has a thickness that can achieve the above-described effects.

(3-b) Step of Bringing Coating into Contact with Non-Solvent to Coagulate Coating When the coating is brought into contact with a non-solvent, the non-solvent diffuses in the coating, and the organic polymer resin, which is insoluble in the non-solvent, coagulates. On the other hand, the solvent, which is soluble in the non-solvent, in the coating is dissolved from the coating. Thus induced phase separation leads to coagulation of the organic polymer resin (and magnesium hydroxide). Thereby, a porous membrane is formed.

The coating may be brought into contact with a non-solvent, for example, by immersing the coating into the non-solvent (coagulation bath).

The non-solvent may be any solvent that does not substantially dissolve the organic polymer resin, and examples thereof include ion exchange water; lower alcohols such as methanol, ethanol, and propyl alcohol; and mixtures of these solvents. Preferred among these is ion exchange water in terms of economic efficiency and liquid waste disposal. The non-solvent may contain a small amount of the same solvent as the solvent contained in the coating.

The non-solvent is preferably used in an amount of 50 to 10000 mass %, more preferably 100 to 5000 mass %, still more preferably 200 to 1000 mass % relative to 100 mass % of the coating, that is, 100 mass % of the solids in the resin mixture used to form the coating. In order to control the porosity of the porous membrane to fall within the preferred range, use of such an amount of the non-solvent is preferred.

(3-c) Step of Drying Coagulated Coating to Give Porous Membrane

A porous membrane can be obtained by drying the coating coagulated in the aforementioned step to remove the non-solvent.

The coating is preferably dried at a temperature of 60° C. to 80° C.

The coating is preferably dried for 2 to 120 minutes, more preferably 5 to 60 minutes, still more preferably 10 to 30 minutes.

As described above, the steps (1) to (3) can simply produce the diaphragm for alkaline water electrolysis of the present invention.

3. Intended Use

The diaphragm for alkaline water electrolysis of the present invention is one with reduced dissolution of an inorganic component in an alkali solution and has excellent alkali resistance. It also has ion permeability and gas barrier properties. Accordingly, the diaphragm for alkaline water electrolysis of the present invention is suitable for a diaphragm for water electrolysis in which an alkaline aqueous solution is used as an electrolyte solution.

The following describes an electrolysis apparatus and an electrolytic method each using the diaphragm for alkaline water electrolysis of the present invention.

(Electrolysis Apparatus)

The diaphragm for alkaline water electrolysis of the present invention may be a member of an alkaline water electrolysis apparatus. The alkaline water electrolysis apparatus may include, for example, an anode, a cathode, and the diaphragm for alkaline water electrolysis between the anode and the cathode. Specifically, the alkaline water electrolysis apparatus may include an anode compartment containing the anode, a cathode compartment containing the cathode, and the diaphragm for alkaline water electrolysis separating the compartments.

The anode and cathode each may be a known electrode containing a conductive substrate containing, for example, nickel or a nickel alloy.

(Electrolytic Method)

Water electrolysis using an alkaline water electrolysis apparatus including the diaphragm for alkaline water electrolysis of the present invention may be performed by any known method. For example, it may be performed by applying a current to an electrolyte solution charged into the alkaline water electrolysis apparatus equipped with the diaphragm for alkaline water electrolysis of the present invention.

The electrolyte solution may be an alkaline aqueous solution in which an electrolyte such as potassium hydroxide or sodium hydroxide is dissolved. The concentration of the electrolyte in the electrolyte solution is preferably, but not limited to, 20 to 40 mass % for further improvement in the electrolysis efficiency.

The temperature of the electrolysis is preferably 50° C. to 120° C., more preferably 80° C. to 90° C. for further improvement in the ion conductivity of the electrolyte solution and further improvement in the electrolysis efficiency. The current application may be performed under known conditions and by a known method.

As described above, the diaphragm for alkaline water electrolysis of the present invention is suitable for a diaphragm for an alkaline water electrolysis apparatus. In an aspect of the present invention, the membrane containing magnesium hydroxide and an organic polymer resin is used as a diaphragm for an alkaline water electrolysis apparatus (use of the membrane containing magnesium hydroxide and an organic polymer resin as a diaphragm for an alkaline water electrolysis apparatus is encompassed in the present invention).

4. Method for Producing Inorganic-Organic Composite Membrane

The present invention also relates to a method for producing an inorganic-organic composite membrane containing a particulate metal hydroxide and a hydrophobic resin, the method including the steps of: forming a coating of a resin composition containing a particulate metal hydroxide, a hydrophobic resin, and a solvent; and bringing the coating into contact with water to coagulate the coating, the solvent being at least one selected from the group consisting of N-methyl-2-pyrrolidone, N,N-dimethylacetamide, N,N-dimethylformamide, and dimethyl sulfoxide.

The method for producing an inorganic-organic composite membrane of the present invention can prevent aggregation of the particulate metal hydroxide, leading to an inorganic-organic composite membrane in which the particulate metal hydroxide is homogeneously dispersed. Thus, the membrane can exhibit sufficient performance.

The reason why the production method of the present invention can lead to the inorganic-organic composite membrane in which the particulate metal hydroxide is homogeneously dispersed is presumably that the solvent allows the particulate metal hydroxide to be miscible with a hydrophobic resin, and thus, aggregation is suppressed.

The method for producing an inorganic-organic composite membrane of the present invention includes forming a coating of a resin composition containing a particulate metal hydroxide, a hydrophobic resin, and a solvent (hereinafter, also referred to as "step (1)") and bringing the coating into contact with water to coagulate the coating (hereinafter, also referred to as "step (2)").

<Step (1)>

The method for producing an inorganic-organic composite membrane of the present invention includes forming a coating of a resin composition containing a particulate metal hydroxide, a hydrophobic resin, and a solvent.

The coating may be formed, for example, by a method including preparing a resin composition containing a particulate metal hydroxide, a hydrophobic resin, and a solvent and forming a coating of the resin composition.

(Particulate Metal Hydroxide)

Examples of the particulate metal hydroxide include hydroxides of magnesium, zirconium, titanium, zinc, aluminum, and tantalum. Preferred among these are magnesium hydroxide, zirconium hydroxide, and titanium hydroxide, with magnesium hydroxide being more preferred because such a particulate metal hydroxide has much better dispersibility. The magnesium hydroxide is preferably the same as the magnesium hydroxide used in the above "diaphragm for alkaline water electrolysis". Each of these particulate metal hydroxides may be used alone, or two or more of these may be used in combination.

The particulate metal hydroxide may be a natural substance or a synthetic substance. The particulate metal hydroxide may be one not surface treated or may be one surface treated with a silane coupling agent, stearic acid, oleic acid, or a phosphoric acid ester.

The particulate metal hydroxide may have any shape as long as it is particulate. The particulate metal hydroxide may be amorphous, spherical, flaky, or hexagonal tabular, for example, and is preferably spherical or flaky because the particulate metal hydroxide having such a shape is easily dispersed in a solvent and allows easy preparation of the resin composition.

The particulate metal hydroxide preferably has an average particle size of 0.01 to 5.0 µm, more preferably 0.05 to 2.0 µm, still more preferably 0.1 to 1.0 µm because such a particulate metal hydroxide can have much better dispersibility.

The average particle size of the particulate metal hydroxide can be determined by the same method as for the average particle size of the magnesium hydroxide described in the above "Diaphragm for alkaline water electrolysis".

(Hydrophobic Resin)

Examples of the hydrophobic resin include fluorine resin, olefin resin, and aromatic hydrocarbon resin.

Examples of the fluorine resin include ethylene-tetrafluoroethylene copolymers, polyvinylidene fluoride, polyvinyl fluoride, vinylidene fluoride-hexafluoropropylene copolymers, tetrafluoroethylene-hexafluoropropylene copolymers, polytetrafluoroethylene, tetrafluoroethylene-perfluoro(alkyl vinyl ether) copolymers, polychlorotrifluoroethylene, and tetrafluoroethylene-hexafluoropropylene-vinylidene fluoride copolymers.

Examples of the olefin resin include low-density polyethylene, high-density polyethylene, polypropylene, polybutene, and polymethylpentene.

Examples of the aromatic hydrocarbon resin include polyethylene terephthalate, polybutylene terephthalate, polybutylene naphthalate, polystyrene, polysulfone, polyethersulfone, polyphenylene sulfide, polyphenylsulfone, polyarylate, polyetherimide, polyimide, and polyamide-imide.

In particular, the hydrophobic resin is preferably aromatic hydrocarbon resin, more preferably at least one selected from the group consisting of polysulfone, polyethersulfone, and polyphenylsulfone because it allows the particulate metal hydroxide to have much better dispersibility. Each of these hydrophobic resins may be used alone, or two or more of these may be used in combination.

(Solvent)

In the production method of the present invention, the solvent is at least one selected from the group consisting of N-methyl-2-pyrrolidone, N,N-dimethylacetamide, N,N-dimethylformamide, and dimethyl sulfoxide. Use of any of these solvents allows preparation of the resin composition in which the metal hydroxide and the hydrophobic resin are homogeneously mixed and dispersed. Use of the resin composition allows production of the inorganic-organic composite membrane in which the metal hydroxide is homogeneously dispersed. Preferred among these is N-methyl-2-pyrrolidone because it allows the particulate metal hydroxide to have much better dispersibility.

The solvent may optionally include a different solvent other than the above solvents. In order to produce a membrane in which the metal hydroxide is much better dispersed, the solvent preferably contains at least one solvent selected from the group consisting of N-methyl-2-pyrrolidone, N,N-dimethylacetamide, N,N-dimethylformamide, and dimethyl sulfoxide in an amount of 80 mass % or more, more preferably 90 mass % or more, still more preferably 95 mass % or more based on 100 mass % of all the solvent components in the resin composition.

The resin composition is preferably prepared by mixing and dispersing the particulate metal hydroxide, the hydrophobic resin, and the solvent mentioned above. Owing to the mixing and dispersing, the particulate metal hydroxide does not aggregate, and the inorganic-organic composite membrane in which the particulate metal hydroxide is homogeneously dispersed can be suitably obtained.

The mixing and dispersing may be performed by any method, and may be performed using a mixer, a ball mill, a jet mill, a disperser, a sand mill, a roll mill, a pot mill, a paint shaker, or other known mixing and dispersing means.

The above components may be mixed in any manner and may be mixed as follows: the particulate metal hydroxide, the hydrophobic resin, and the solvent are simultaneously mixed; a dispersion (slurry) of the particulate metal hydroxide in the solvent is prepared in advance, and the slurry is mixed with the hydrophobic resin; or a solution is prepared in which the hydrophobic resin is dissolved in the solvent, and the solution is mixed with the slurry.

The resin composition in an amount of 100 mass % preferably contains 15 to 50 mass % of the particulate metal hydroxide, 3 to 22 mass % of the hydrophobic resin, and 45 to 75 mass % of the solvent. The resin composition containing these components in amounts within the above ranges allows easy production of the inorganic-organic composite membrane in which the particulate metal hydroxide is highly dispersed.

The resin composition in an amount of 100 mass % more preferably contains 20 to 45 mass % of the particulate metal hydroxide, 5 to 18 mass % of the hydrophobic resin, and 47 to 70 mass % of the solvent, still more preferably contains 25 to 40 mass % of the particulate metal hydroxide, 7 to 15 mass % of the hydrophobic resin, and 50 to 65 mass % of the solvent.

The coating of the resin composition may be formed by any method, and may be formed by a known method. For example, the coating may be formed by applying the resin composition to a substrate or by immersing a substrate in the resin composition. The application may be performed by the same application method as that described in the above "Method for producing diaphragm for alkaline water electrolysis".

The substrate may be the same as that used in the above "Method for producing diaphragm for alkaline water electrolysis".

<Step (2)>

The method for producing an inorganic-organic composite membrane of the present invention includes bringing the coating formed in the step (1) into contact with water to coagulate the coating (hereinafter, also referred to as "step (2)").

When the coating is brought into contact with water, water diffuses in the coating, and the hydrophobic resin, which is insoluble in water, coagulates. On the other hand, the solvent, which is soluble in water, in the coating is dissolved from the coating. The phase separation induced based on the solubilities in water leads to coagulation of the hydrophobic resin. Thereby, a porous membrane is formed. The coating may be brought into contact with water, for example, by immersing the coating into water (coagulation bath). Water may be distilled water or ion exchange water, with ion exchange water being preferred.

Water is preferably used in an amount of 50 to 10000 mass %, more preferably 100 to 5000 mass %, still more preferably 200 to 1000 mass % relative to 100 mass % of the coating, that is, 100 mass % of the solids in the resin composition used to form the coating.

After the step (2), preferably, the coagulated coating is dried to remove water, whereby a porous membrane is obtained.

The coating may be dried at any temperature and heated for any duration. The temperature and duration may be appropriately designed depending on the intended use, purpose, and the size of the inorganic-organic composite membrane. For example, the temperature and duration may be the same as those described in the above "Method for producing diaphragm for alkaline water electrolysis".

As described above, the steps (1) and (2) can produce the inorganic-organic composite membrane. In the thus obtained inorganic-organic composite membrane, the particulate metal hydroxide is prevented from secondary aggregation and is very highly dispersed. Thus, the membrane can exhibit sufficient performance.

The inorganic-organic composite membrane may further include a support. In other words, the inorganic-organic composite membrane may include a support and a membrane containing a particulate metal hydroxide and a hydrophobic resin (inorganic-organic composite). The inorganic-organic composite may be a composite in which the support and the membrane containing a particulate metal hydroxide and a hydrophobic resin are integrated with each other.

The support may be the same as the porous support described in the above "Diaphragm for alkaline water electrolysis".

The inorganic-organic composite membrane including the support can be produced by the same method as for the diaphragm for alkaline water electrolysis including the porous support. Specifically, in the production of the inorganic-organic composite membrane including the support, the resin composition may be applied to the support to form a coating, or the resin composition is applied to a substrate and the support is placed on the applied liquid to impregnate the support with the applied liquid.

The inorganic-organic composite membrane preferably contains the particulate metal hydroxide in an amount of 30 to 90 mass %, more preferably 32 to 85 mass %, still more preferably 35 to 80 mass %.

In the inorganic-organic composite membrane not including the support, the particulate metal hydroxide is preferably present in an amount of 60 to 90 mass %, more preferably 65 to 85 mass %, still more preferably 70 to 80 mass %. In the inorganic-organic composite membrane including the support, the particulate metal hydroxide is preferably present in an amount of 30 to 45 mass %, more preferably 32 to 43 mass %, still more preferably 35 to 40 mass %.

The inorganic-organic composite membrane preferably contains the hydrophobic resin in an amount of 5 to 40 mass %, more preferably 7 to 35 mass %, still more preferably 10 to 30 mass %.

In the inorganic-organic composite membrane not including the support, the hydrophobic resin is preferably present in an amount of 10 to 40 mass %, more preferably 15 to 35 mass %, still more preferably 20 to 30 mass %.

In the inorganic-organic composite membrane including the support, the hydrophobic resin is preferably present in an amount of 5 to 20 mass %, more preferably 7 to 18 mass %, still more preferably 10 to 15 mass %.

The inorganic-organic composite membrane may have any thickness. The thickness may be appropriately designed depending on the purpose and intended use. It is usually 10 to 1000 μm, preferably 20 to 500 μm, more preferably 30 to 300 μm.

The inorganic-organic composite membrane preferably has a porosity of 10 to 90 vol %, more preferably 20 to 70 vol %, still more preferably 30 to 70 vol %.

The porosity can be determined by the same method as for the porosity described in the above "Diaphragm for alkaline water electrolysis".

The pore size of the inorganic-organic composite membrane is preferably 0.01 to 1 μm, more preferably 0.05 to 0.9 μm, still more preferably 0.1 to 0.8 μm. Pores having a size within the above ranges can lead to much better ion permeability.

The pore size can be determined by the same method as for the pore size described in the above "Diaphragm for alkaline water electrolysis".

The inorganic-organic composite membrane can be used not only for the above diaphragm for alkaline water electrolysis, but also for, but not limited to, a separator for cells, such as a separator for alkaline fuel cells, primary cells, or secondary cells or a separator for chlor-alkali electrolysis.

Thus, the method for producing an inorganic-organic composite membrane of the present invention leads to an inorganic-organic composite membrane in which the particulate metal hydroxide is prevented from secondary aggregation and is homogeneously dispersed. The method for producing an inorganic-organic composite membrane of the present invention is also suitable for the production of a diaphragm for alkaline water electrolysis; a separator for cells, such as a separator for alkaline fuel cells, primary cells, or secondary cells; or a separator for chlor-alkali electrolysis.

EXAMPLES

Hereinafter, the present invention will be described in more detail based on the examples which, however, are not intended to limit the scope of the present invention. Here, "part(s)" refers to "part(s) by mass" and "%" refers to "mass %", unless otherwise specified.

In EXAMPLES, the physical properties were measured under the following conditions.

(1) Alkali Resistance Test (1-1) Evaluation Before Resistance Test

A 3 cm×3 cm square specimen was cut from a diaphragm for alkaline water electrolysis. The specimen was placed in a fluororesin container (made of PFA) and immersed in 30 g of a 30% KOH aqueous solution at 90° C. for 20 hours. After the immersion, the specimen was taken out therefrom and subjected to measurements of the membrane resistance, mass, and size. The membrane resistance was measured with Battery HiTester 3555 (Hioki E.E. Corporation).

The membrane resistance was represented by the measured value (0) and the value ($\Omega cm^2$) based on the area of the measured sample (9 $cm^2$).

(1-2) Evaluation after Resistance Test

A 3 cm×3 cm specimen was placed in a fluororesin container (made of PFA) and immersed in 30 g of a 30% KOH aqueous solution as in (1) in a constant-temperature dryer at 90° C. for one week. After the immersion, the specimen was subjected to measurements of the membrane resistance, mass, and size as in (1-1).

The membrane resistance was represented by the measured value ($\Omega$) and the value ($\Omega cm^2$) based on the area of the measured sample (9 $cm^2$).

(2) Measurement of Amount of Inorganic Component Dissolved

Whether or not an inorganic component (magnesium, zirconium) was dissolved from the diaphragm for alkaline water electrolysis after the alkali resistance test was examined as follows. The amount of magnesium (or zirconium) in the KOH aqueous solution in which the specimen had been immersed in the alkali resistance test was quantified with an inductively coupled plasma mass spectrometer (ICP-MS, 7700S available from Agilent Technologies Inc.) under an S lens condition. The samples used were 1000-fold dilutions, with pure water, of the KOH aqueous solutions in which the specimen had been immersed in the tests (1-1) and (1-2). The amount of magnesium (or zirconium) in the solution before the resistance test was subtracted from the amount of magnesium (or zirconium) in the solution after the resistance test to determine the amount of magnesium (or zirconium) dissolved.

(3) Measurement of Pore

The pore size was determined from a surface observation image (magnification: 25000×) of the diaphragm for alkaline water electrolysis after the alkali resistance test based on FE-SEM measurement. Specifically, any 10 voids in the FE-SEM image of the diaphragm for alkaline water electrolysis after the alkali resistance test were analyzed using analysis software (Image-Pro Premier) to determine the pore diameters, each passing through the center of gravity of each void.

(4) Measurement of Porosity

Three 3 cm×3 cm square samples were cut from a diaphragm for alkaline water electrolysis. These samples were immersed in an electrolyte solution (30% KOH aqueous solution) overnight and subjected to measurement of the mass before and after immersion. The porosities of the samples were calculated using the following equation and averaged to determine the porosity of the diaphragm.

Porosity (vol %)=(Mass of diaphragm after immersion−Mass of diaphragm before immersion)/Density of electrolyte solution/Volume of diaphragm×100

(5) Measurement of FE-SEM

The surface of a diaphragm for alkaline water electrolysis before and after the alkali resistance test was observed by FE-SEM.

Apparatus: Model "JSM-7600F" available from JEOL Ltd.
Magnification: 25000×

(6) Measurement of Aspect Ratio

The aspect ratio was determined as follows: particles such as particulate magnesium hydroxide were observed with a FE-SEM (Model "JSM-7600F" available from JEOL Ltd.) at a magnification of 20000×, any 10 particles in the resulting image were analyzed using analysis software (Image-Pro Premier) to determine the ratio of the largest diameter <a> to the smallest diameter <b> (<a>/<b>) of each particle, and the ratios were averaged to obtain a simple average as the aspect ratio of the particles.

The smallest diameter <b> of each particle was the smallest diameter of the diameters each passing through the midpoint of the largest diameter and perpendicular to the largest diameter. For example, in the case of a flaky particle, the largest diameter is determined as the largest diameter of the flaky face of the particle, and the smallest diameter is determined as the thickness passing through the midpoint of the largest diameter.

(7) Measurement of Average Particle Size

The average particle size of particles such as particulate magnesium hydroxide was determined as follows. Specifically, the particle size distribution was determined with a laser diffraction/scattering particle size distribution analyzer (Model: "LA-920" available from Horiba, Ltd.), and the median size (D50) in the particle size distribution by volume was determined as the average particle size. The measurement sample was a mixture of ethanol and particles dispersed therein by ultrasonic irradiation.

(8) Powder X-Ray Diffraction Measurement of Particulate Magnesium Hydroxide and Calculation of Crystallite Size Particulate magnesium hydroxide (powder) was subjected to measurement under the following conditions using an X-ray diffractometer (trade name: SmartLab available from Rigaku Corporation).

(Measurement Conditions)
X-ray tube: Cu
X-ray output: 45 kV, 200 mA
Scanning speed: 5°/min
Scanning area: 5° to 90°

The crystallite size in the direction perpendicular to each of the crystal planes was determined from the peak of the corresponding crystal plane of the obtained magnesium hydroxide according to the following calculation of a crystallite size.

(Calculation of Crystallite Size)

The crystallite size was calculated using the Scherrer equation (the following equation):

(Crystallite size)=$K\lambda/((\beta \cos \theta)$ wherein K is the Scherrer constant and is 0.94;
λ is the wavelength of the X-ray tube used;
β is a value determined from β=b–B, where b is the half-width for perfect and well-grown crystal, and B is the half-width obtained by actual measurement; and
θ is θ in the diffraction angle 2θ.

Example 1

(1. Preparation of Magnesium Hydroxide Dispersion)

Magnesium hydroxide (Kyowa Chemical Industry Co., Ltd., product number: 200-06H, average particle size: 0.54 μm, aspect ratio: 3.52, crystallite size in the direction perpendicular to the (110) plane: 70.7 nm) and N-methyl-2-pyrrolidone (Wako Pure Chemical Industries, Ltd.) were mixed in a mass ratio of 1:1, and they were dispersed in a pot mill containing zirconia media balls at room temperature for six hours. Thus, a magnesium hydroxide dispersion was prepared.

(2. Preparation of Polysulfone Resin Solution)

Polysulfone resin (BASF Japan Ltd., product number: Ultrason S3010) was thermally dissolved in N-methyl-2-pyrrolidone (Wako Pure Chemical Industries, Ltd.) at 80° C. to 100° C. to a concentration of 30 mass %. Thus, a polysulfone resin-dissolved liquid was prepared.

(3. Preparation of Coating Liquid)

The magnesium hydroxide dispersion and the polysulfone resin-dissolved liquid in amounts that satisfy the ratio of 33 parts by mass of polysulfone resin (PSU) to 100 parts by mass of magnesium hydroxide were mixed using a planetary centrifugal mixer (Thinky Corporation, product number: THINKYMIXER (Awatori Rentaro) ARE-500) at 1000 rpm at room temperature for about 10 minutes. The resulting mixture was filtered through a 200-mesh stainless steel screen to give a coating liquid.

(4. Formation of Coating)

The coating liquid was applied to a polyethylene terephthalate (PET) film with an applicator to prepare a coating so that the coating liquid after drying had a weight of 12.0 mg/cm². Thereafter, the workpiece was subjected to water bathing at room temperature for 10 minutes to coagulate the coating, and the coating was separated from the PET film. After the water bathing, the resulting membrane was dried with a dryer at 80° C. for 30 minutes. Thus, a 300-μm-thick diaphragm for alkaline water electrolysis containing magnesium hydroxide and a polysulfone resin was obtained.

Example 2

A diaphragm for alkaline water electrolysis was obtained as in Example 1, except that (4. Formation of coating) in Example 1 was performed as follows.

(4'. Formation of Coating)

The coating liquid was applied to a PET film with an applicator so that the coating liquid after drying had a weight of 12.0 mg/cm². A polypropylene (PP) non-woven fabric (Japan Vilene Company, Ltd., product number: OA16728F, thickness: 160 μm, mass per unit area: 60 g/m²) was brought into contact with the applied coating liquid so that the coating liquid was completely impregnated into the fabric. Thereafter, the non-woven fabric impregnated with the coating liquid was subjected to water bathing at room temperature for 10 minutes to coagulate the coating liquid. Thereby, a membrane was formed. The membrane was separated together with the non-woven fabric from the PET film. After the water bathing, the resulting membrane was dried with a dryer at 80° C. for 30 minutes. Thus, a 300-μm-thick diaphragm for alkaline water electrolysis was obtained as a composite of the non-woven fabric and the membrane containing magnesium hydroxide and a polysulfone resin.

Example 3

A diaphragm for alkaline water electrolysis was obtained as in Example 1, except that polyethersulfone (PESU) (Ultrason E3010 available from BASF Japan Ltd.) was used instead of the polysulfone resin.

Example 4

A diaphragm for alkaline water electrolysis was obtained as in Example 2, except that polyethersulfone (PESU) (Ultrason E3010 available from BASF Japan Ltd.) was used instead of the polysulfone resin.

Example 5

A diaphragm for alkaline water electrolysis was obtained as in Example 1, except that polyphenylsulfone (PPSU) (Ultrason P3010 available from BASF Japan Ltd.) was used instead of the polysulfone resin.

Example 6

A diaphragm for alkaline water electrolysis was obtained as in Example 2, except that polyphenylsulfone (PPSU) (Ultrason P3010 available from BASF Japan Ltd.) was used instead of the polysulfone resin.

Example 7

A diaphragm for alkaline water electrolysis was obtained as in Example 2, except that the magnesium hydroxide was particulate magnesium hydroxide (average particle size: 0.2 μm, aspect ratio: 6.21, crystallite size in the direction perpendicular to the (110) plane: 40.1 nm).

Example 8

A diaphragm for alkaline water electrolysis was obtained as in Example 4, except that the magnesium hydroxide was particulate magnesium hydroxide (average particle size: 0.2 μm, aspect ratio: 6.21, crystallite size in the direction perpendicular to the (110) plane: 40.1 nm).

Example 9

A diaphragm for alkaline water electrolysis was obtained as in Example 6, except that the magnesium hydroxide was particulate magnesium hydroxide (average particle size: 0.2 μm, aspect ratio: 6.21, crystallite size in the direction perpendicular to the (110) plane: 40.1 nm).

Example 10

A diaphragm for alkaline water electrolysis was obtained as in Example 2, except that the magnesium hydroxide was particulate magnesium hydroxide (average particle size: 0.2 µm, aspect ratio: 6.21, crystallite size in the direction perpendicular to the (110) plane: 40.1 nm), and the porous support was a polyphenylene sulfide (PPS) non-woven fabric (mass per unit area: 110 g/m², thickness: 214 µm).

Example 11

A diaphragm for alkaline water electrolysis was obtained as in Example 4, except that the magnesium hydroxide was particulate magnesium hydroxide (average particle size: 0.2 µm, aspect ratio: 6.21, crystallite size in the direction perpendicular to the (110) plane: 40.1 nm), and the porous support was a polyphenylene sulfide (PPS) non-woven fabric (mass per unit area: 110 g/m², thickness: 214 µm).

Example 12

A diaphragm for alkaline water electrolysis was obtained as in Example 6, except that the magnesium hydroxide was particulate magnesium hydroxide (average particle size: 0.2 µm, aspect ratio: 6.21, crystallite size in the direction perpendicular to the (110) plane: 40.1 nm), and the porous support was a polyphenylene sulfide (PPS) non-woven fabric (mass per unit area: 110 g/m², thickness: 214 µm).

Example 13

A diaphragm for alkaline water electrolysis was obtained as in Example 2, except that the magnesium hydroxide was particulate magnesium hydroxide (average particle size: 0.2 µm, aspect ratio: 6.21, crystallite size in the direction perpendicular to the (110) plane: 40.1 nm), and the porous support was a polyphenylene sulfide (PPS) mesh (150 mesh, thickness: 100 µm).

Example 14

A diaphragm for alkaline water electrolysis was obtained as in Example 2, except that the magnesium hydroxide was particulate magnesium hydroxide (average particle size: 0.74 µm, aspect ratio 4.75, crystallite size in the direction perpendicular to the (110) plane 52.3 nm), and the porous support was a polyphenylene sulfide (PPS) non-woven fabric (mass per unit area: 110 g/m², thickness: 214 µm).

Example 15

A diaphragm for alkaline water electrolysis was obtained as in Example 2, except that the magnesium hydroxide was particulate magnesium hydroxide (average particle size: 0.2 µm, aspect ratio: 6.21, crystallite size in the direction perpendicular to the (110) plane: 40.1 nm), and the porous support was a polyphenylene sulfide (PPS) non-woven fabric (mass per unit area: 110 g/m², thickness: 214 µm).

Comparative Example 1

A diaphragm for alkaline water electrolysis was obtained as in Example 1, except that zirconia (Daiichi Kigenso Kagaku Kogyo Co., Ltd., product number: UEP) was used instead of the magnesium hydroxide. In order to determine the amount of an inorganic component dissolved from the resulting diaphragm, the amount of zirconium was quantified.

Comparative Example 2

A diaphragm for alkaline water electrolysis was obtained as in Example 2, except that zirconia (Daiichi Kigenso Kagaku Kogyo Co., Ltd., product number: UEP) was used instead of the magnesium hydroxide. In order to determine the amount of inorganic component dissolved from the resulting diaphragm, the amount of zirconium was quantified.

Comparative Example 3

A diaphragm for alkaline water electrolysis was obtained as in Comparative Example 2, except that the porous support was a polyphenylene sulfide (PPS) non-woven fabric (mass per unit area: 110 g/m², thickness: 214 µm).

Comparative Example 4

A diaphragm for alkaline water electrolysis was obtained as in Comparative Example 2, except that the porous support was a polyphenylene sulfide mesh (mesh 150, thickness: 100 µm).

Each diaphragm for alkaline water electrolysis was subjected to measurement of porosity. It was also subjected to the alkali resistance test and evaluated for dimensional change, mass change, and membrane resistance of the diaphragm before and after the resistance test. After the alkali resistance test, the amount of inorganic components dissolved and the size of a pore were evaluated. The results are shown in Table 1.

Figure 2:
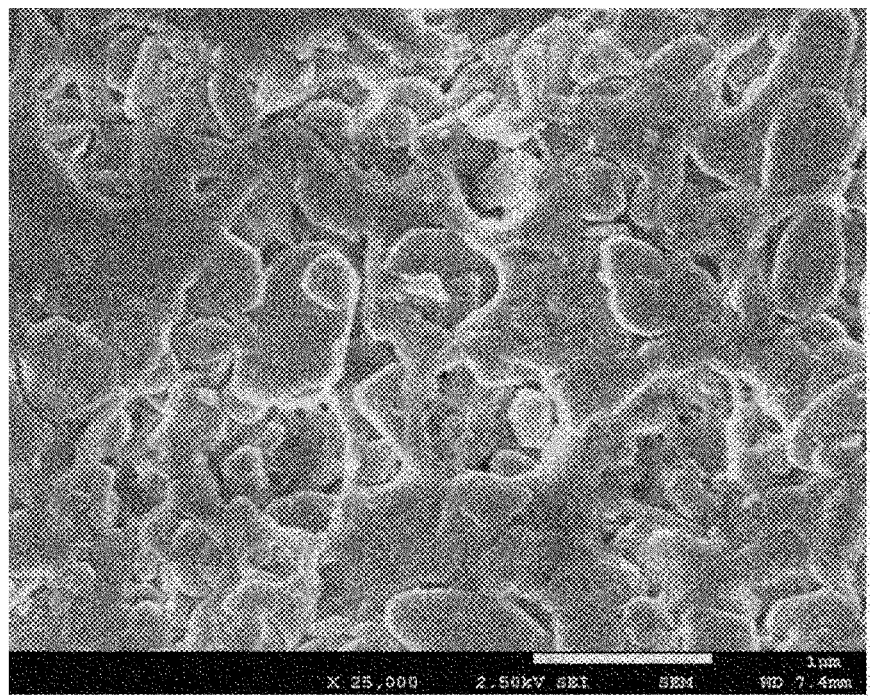
FIG. 2 is a photograph of a field emission scanning electron microscope (FE-SEM) image (magnification: 25000×) of the surface of the diaphragm for alkaline water electrolysis obtained in Example 1 after the alkali resistance test.

The micrographs of the surface of the diaphragm for alkaline water electrolysis obtained in Example 1 before and after the alkali resistance test were taken with a field emission scanning electron microscope (FE-SEM) and are shown in FIGS. 1 and 2.

TABLE 1

| | | Example 1 | Example 2 | Example 3 | Example 4 | Example 5 | Example 6 | Example 7 | Example 8 |
|---|---|---|---|---|---|---|---|---|---|
| Composition | Inorganic component | Mg(OH)₂ | Mg(OH)₂ | Mg(OH)₂ | Mg(OH)₂ | Mg(OH)₂ | Mg(OH)₂ | Mg(OH)₂ | Mg(OH)₂ |
| | Average particle size of inorganic component (µm) | 0.54 | 0.54 | 0.54 | 0.54 | 0.54 | 0.54 | 0.2 | 0.2 |
| | Resin | PSU | PSU | PESU | PESU | PPSU | PPSU | PSU | PESU |
| | Porous support | None | PP non-woven fabric | None | PP non-woven fabric | None | PP non-woven fabric | PP non-woven fabric | PP non-woven fabric |
| Porosity (vol %) | | 30 | 42 | 35 | 38 | 33 | 45 | 44 | 41 |
| Alkali resistance test | Size change | No change | No change | No change | No change | No change | No change | No change | No change |
| | Mass change | No change | No change | No change | No change | No change | No change | No change | No change |

TABLE 1-continued

|  | | | | | | | | |
|---|---|---|---|---|---|---|---|---|
| Amount of inorganic component (Mg, Zr) released (ppm) | 0.1 | 0.3 | 0.2 | 0.1 | 0.1 | 0.2 | 0.2 | 0.3 |
| Membrane resistance before testing ($\Omega$) | 0.09 | 0.08 | 0.08 | 0.1 | 0.09 | 0.09 | 0.06 | 0.05 |
| Membrane resistance before testing ($\Omega cm^3$) | 0.81 | 0.72 | 0.72 | 0.9 | 0.81 | 0.81 | 0.54 | 0.45 |
| Membrane resistance after testing ($\Omega$) | 0.1 | 0.08 | 0.07 | 0.09 | 0.1 | 0.08 | 0.04 | 0.05 |
| Membrane resistance after testing ($\Omega cm^2$) | 0.9 | 0.72 | 0.63 | 0.81 | 0.9 | 0.72 | 0.36 | 0.45 |
| Pore ($\mu m$) | 0.8 | 0.5 | 0.6 | 0.9 | 0.7 | 0.8 | 0.4 | 0.5 |

|  | | | Example 9 | Example 10 | Example 11 | Example 12 | Example 13 | Example 14 | Example 15 |
|---|---|---|---|---|---|---|---|---|---|
| Composition | Inorganic component | | $Mg(OH)_2$ | $Mg(OH)_2$ | $Mg(OH)_2$ | $Mg(OH)_2$ | $Mg(OH)_2$ | $Mg(OH)_2$ | $Mg(OH)_2$ |
| | Average particle size of inorganic component ($\mu m$) | | 0.2 | 0.2 | 0.2 | 0.2 | 0.2 | 0.74 | 0.2 |
| | Resin | | PPSU | PSU | PESU | PPSU | PSU | PSU | PSU |
| | Porous support | | PP non-woven fabric | PPS non-woven fabric | PPS non-woven fabric | PPS non-woven fabric | PPS mesh | PPS non-woven fabric | PPS non-woven fabric |
| Porosity (vol %) | | | 43 | 40 | 41 | 41 | 37 | 45 | 63 |
| Alkali resistance test | Size change | | No change | No change | | No change | | | |
| | Mass change | | No change | No change | No change | No change | No change | | |
| | Amount of inorganic component (Mg, Zr) released (ppm) | | 0.3 | 0.2 | 0.2 | 0.3 | 0.3 | 0.1 | 0.3 |
| | Membrane resistance before testing ($\Omega$) | | 0.06 | 0.07 | 0.06 | 0.06 | 0.05 | 0.11 | 0.1 |
| | Membrane resistance before testing ($\Omega cm^3$) | | 0.54 | 0.63 | 0.54 | 0.54 | 0.45 | 0.99 | 0.9 |
| | Membrane resistance after testing ($\Omega$) | | 0.04 | 5 | 0.04 | 0.05 | 0.04 | 0.11 | 0.1 |
| | Membrane resistance after testing ($\Omega cm^2$) | | 0.36 | 45 | 0.36 | 0.45 | 0.36 | 0.99 | 0.9 |
| | Pore ($\mu m$) | | 0.5 | 0.4 | 0.4 | 0.3 | 0.3 | 0.9 | 0.9 |

TABLE 2

|  | | Comparative Example 1 | Comparative Example 2 | Comparative Example 3 | Comparative Example 4 |
|---|---|---|---|---|---|
| Composition | Inorganic component | $ZrO_2$ | $ZrO_2$ | $ZrO_2$ | $ZrO_2$ |
| | Average particle size of inorganic component ($\mu m$) | 0.2 | 0.2 | 0.2 | 0.2 |
| | Resin | PSU | PSU | PSU | PSU |
| | Porous support | None | PP non-woven fabric | PPS non-woven fabric | PPS Mesh |
| Porosity (vol %) | | 63 | 51 | 55 | 58 |
| Alkali resistance test | Size change | No change | No change | No change | No change |
| | Mass change | No change | No change | No change | No change |
| | Amount of inorganic component (Mg, Zr) released (ppm) | 0.1 | 0.1 | 0.1 | 0.2 |
| | Membrane resistance before testing ($\Omega$) | 0.08 | 0.09 | 0.11 | 0.15 |
| | Membrane resistance before testing ($\Omega cm^2$) | 0.72 | 0.81 | 0.99 | 1.35 |
| | Membrane resistance after testing ($\Omega$) | 0.07 | 0.09 | 0.09 | 0.11 |
| | Membrane resistance after testing ($\Omega cm^2$) | 0.63 | 0.81 | 0.81 | 0.99 |
| | Pore ($\mu m$) | 1.4 | 1.2 | 1.1 | 1.3 |

Tables 1 and 2 show that the diaphragms for alkaline water electrolysis containing magnesium hydroxide and an organic polymer resin are ones with reduced dissolution of inorganic components even in an alkali solution.

In addition, the diaphragms for alkaline water electrolysis containing magnesium hydroxide and an organic polymer resin did not show dimensional change and mass change before and after the alkali resistance test using a high concentration alkali solution at 90° C. Also, the membrane resistance did not change, but remained at a sufficiently low value. These demonstrate that the diaphragms for alkaline water electrolysis containing magnesium hydroxide and an organic polymer resin had excellent ion permeability, alkali resistance, and heat resistance.

Further, the diaphragms for alkaline water electrolysis containing magnesium hydroxide and an organic polymer resin had ion permeability, alkali resistance, and heat resistance equal to or higher than those of conventional diaphragms for alkaline water electrolysis containing zirconium oxide.

Further, the diaphragms for alkaline water electrolysis containing magnesium hydroxide and an organic polymer resin had smaller pores than conventional diaphragms for alkaline water electrolysis containing zirconium oxide. Accordingly, they are expected to have excellent gas barrier properties.

Thus, the presence of magnesium hydroxide and an organic polymer resin leads to a diaphragm for alkaline water electrolysis with reduced dissolution of an inorganic component in an alkali solution, having excellent ion permeability, alkali resistance, and heat resistance. Also, the diaphragm for alkaline water electrolysis of the present invention can be produced using magnesium hydroxide, which is of relatively low cost, and thus can be prepared at low cost.

The invention claimed is:

1. A diaphragm for alkaline water electrolysis, comprising:
    magnesium hydroxide;
    an organic polymer resin; and
    a porous support selected from the group consisting of a non-woven fabric, a woven fabric, and a mesh.

2. The diaphragm for alkaline water electrolysis according to claim 1,
    wherein the organic polymer resin is at least one selected from the group consisting of polysulfone, polyethersulfone, and polyphenylsulfone.

3. The diaphragm for alkaline water electrolysis according to claim 1,
    wherein the magnesium hydroxide has an average particle size of 0.05 to 2.0 µm.

4. The diaphragm for alkaline water electrolysis according to claim 1, which has a porosity of 20 to 80 vol %.

5. The diaphragm for alkaline water electrolysis according to claim 1,
    wherein the diaphragm for alkaline water electrolysis contains 20 to 40 parts by mass of the organic polymer resin relative to 100 parts by mass of the magnesium hydroxide.

6. The diaphragm for alkaline water electrolysis according to claim 1,
    wherein the porous support contains at least one resin selected from the group consisting of polypropylene, polyethylene, and polyphenylene sulfide.

7. A method for producing a diaphragm for alkaline water electrolysis containing magnesium hydroxide and an organic polymer resin, the method comprising the steps of:
    preparing a dispersion containing magnesium hydroxide and a solvent;
    mixing the dispersion and an organic polymer resin to prepare a resin mixture; and
    applying the resin mixture to a porous support selected from the group consisting of a non-woven fabric, a woven fabric, and a mesh.

8. The method for producing a diaphragm for alkaline water electrolysis according to claim 7,
    wherein the step of forming a membrane comprises the steps of:
    forming a coating of the resin mixture;
    bringing the coating into contact with a non-solvent to coagulate the coating; and
    drying the coagulated coating to give a porous membrane.

9. An alkaline water electrolysis apparatus, comprising:
    an anode;
    a cathode; and
    a diaphragm according to claim 1 that defines separate compartments for the anode and the cathode.

10. A method for producing an inorganic-organic composite membrane containing a particulate metal hydroxide and a hydrophobic resin, the method comprising the steps of:
    forming a coating of a resin composition containing a particulate metal hydroxide, a hydrophobic resin, and a solvent on a porous support selected from the group consisting of a non-woven fabric, a woven fabric, and a mesh; and
    bringing the coating into contact with water to coagulate the coating,
    the solvent being at least one selected from the group consisting of N-methyl-2-pyrrolidone, N,N-dimethylacetamide, N,N-dimethylformamide, and dimethyl sulfoxide,
    wherein the particulate metal hydroxide comprises particulates of magnesium hydroxide and the hydrophobic resin comprises an organic polymer resin.

11. The method for producing an inorganic-organic composite membrane according to claim 10,
    wherein the resin composition is prepared by mixing and dispersing a particulate metal hydroxide, a hydrophobic resin, and a solvent.

12. The method for producing an inorganic-organic composite membrane according to claim 10,
    wherein the hydrophobic resin is at least one selected from the group consisting of polysulfone, polyethersulfone, and polyphenylsulfone.

13. The method for producing an inorganic-organic composite membrane according to claim 10,
    wherein the resin composition in an amount of 100 mass % contains 15 to 50 mass % of the particulate metal hydroxide, 3 to 22 mass % of the hydrophobic resin, and 45 to 75 mass % of the solvent.

14. The diaphragm for alkaline water electrolysis according to claim 1,
    wherein the magnesium hydroxide is tabular and has an aspect ratio of 2.0 to 8.0.

15. The diaphragm for alkaline water electrolysis according to claim 1,
    wherein the magnesium hydroxide has a crystallite size in the direction perpendicular to the (110) plane determined by X-ray diffraction of 35 nm or greater.

16. The diaphragm for alkaline water electrolysis according to claim 1, wherein the magnesium hydroxide has a crystallite size in the direction perpendicular to the (001) plane determined by X-ray diffraction of 15 nm or greater.

17. The diaphragm for alkaline water electrolysis according to claim 1, which has a porosity of 25 to 75 vol %.

18. The diaphragm for alkaline water electrolysis according to claim 1, wherein a surface of the magnesium hydroxide is coated by the organic polymer resin.

* * * * *